(12) United States Patent
Yamazaki et al.

(10) Patent No.: US 11,742,150 B2
(45) Date of Patent: *Aug. 29, 2023

(54) SOLID ELECTROLYTIC CAPACITOR INCLUDING AN EXTERIOR BODY THAT COVERS A CAPACITOR ELEMENT AND METHOD OF MANUFACTURING THE SAME

(71) Applicant: Panasonic Intellectual Property Management Co., Ltd., Osaka (JP)

(72) Inventors: Renki Yamazaki, Osaka (JP); Takahiro Kumakawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,274

(22) Filed: May 20, 2021

(65) Prior Publication Data

US 2021/0383982 A1 Dec. 9, 2021

(30) Foreign Application Priority Data

Jun. 5, 2020 (JP) .................................. 2020-098596

(51) Int. Cl.
*H01G 9/012* (2006.01)
*H01G 9/15* (2006.01)
*H01G 9/10* (2006.01)
*H01G 9/07* (2006.01)
*H01G 9/042* (2006.01)

(52) U.S. Cl.
CPC ............... *H01G 9/15* (2013.01); *H01G 9/012* (2013.01); *H01G 9/042* (2013.01); *H01G 9/07* (2013.01); *H01G 9/10* (2013.01)

(58) Field of Classification Search
CPC ........... H01G 9/07; H01G 9/042; H01G 9/15; H01G 9/10; H01G 9/012
See application file for complete search history.

(56) References Cited

U.S. PATENT DOCUMENTS

| 5,349,496 A * | 9/1994 | Taniguchi | H01G 9/012 361/540 |
| 6,259,348 B1 * | 7/2001 | Kuriyama | H01H 85/0411 337/248 |
| 11,227,725 B2 * | 1/2022 | Kumakawa | H01G 9/07 |
| 2002/0001169 A1 * | 1/2002 | Shiraishi | H01G 9/26 361/523 |

(Continued)

FOREIGN PATENT DOCUMENTS

| CN | 205542811 U * | 8/2016 | ............. H01G 9/012 |
| JP | 10321460 A * | 12/1998 | |

(Continued)

*Primary Examiner* — David M Sinclair
(74) *Attorney, Agent, or Firm* — Wenderoth, Lind & Ponack, L.L.P.

(57) ABSTRACT

A capacitor element that has an anode body, a dielectric oxide film layer covering the anode body, and a cathode body formed on the dielectric oxide film layer; an exterior body that covers the capacitor element; a contact layer that is on an anode terminal, which is an end portion of the anode body, and has a surface with a predetermined surface roughness; and an anode-side electrode layer that covers the surface are provided.

7 Claims, 5 Drawing Sheets

(56) References Cited

U.S. PATENT DOCUMENTS

| | | | | |
|---|---|---|---|---|
| 2002/0054470 | A1* | 5/2002 | Kuriyama | H01G 9/08 |
| | | | | 29/25.03 |
| 2003/0026064 | A1* | 2/2003 | Nakada | H01G 9/15 |
| | | | | 361/523 |
| 2010/0165547 | A1 | 7/2010 | Kuranuki et al. | |
| 2012/0099242 | A1* | 4/2012 | Ohyama | H01G 9/012 |
| | | | | 29/25.03 |
| 2014/0233147 | A1* | 8/2014 | Hong | H01G 4/008 |
| | | | | 361/301.4 |
| 2016/0071654 | A1 | 3/2016 | Kimura et al. | |
| 2020/0266005 | A1* | 8/2020 | Suzuki | H01G 9/0032 |
| 2020/0273628 | A1* | 8/2020 | Suzuki | H01G 9/048 |

FOREIGN PATENT DOCUMENTS

| | | | | |
|---|---|---|---|---|
| JP | 2008-091465 | | 4/2008 | |
| JP | 2009-076872 | | 4/2009 | |
| JP | 2009094473 A | * | 4/2009 | H01G 9/012 |
| JP | 2009094474 A | * | 4/2009 | H01G 9/012 |
| JP | 2010-062406 | | 3/2010 | |
| WO | 2014/188833 | | 11/2014 | |
| WO | WO-2019065870 A1 | * | 4/2019 | H01G 9/0032 |
| WO | WO-2019087692 A1 | * | 5/2019 | H01G 9/0032 |

\* cited by examiner

SOLID ELECTROLYTIC CAPACITOR INCLUDING AN EXTERIOR BODY THAT COVERS A CAPACITOR ELEMENT AND METHOD OF MANUFACTURING THE SAME

BACKGROUND

1. Technical Field

The present disclosure relates to a solid electrolytic capacitor and a method of manufacturing the same.

2. Description of the Related Art

As the frequency of electronic devices increases, a capacitor, which is one of the electronic components, is also required to have excellent impedance characteristics in the high frequency region. In order to meet such demands, various solid electrolytic capacitors using a conductive polymer having high electrical conductivity as a solid electrolyte are studied. As such a solid electrolytic capacitor, for example, there is one disclosed in International Publication No. 2014/188833.

In addition, in recent years, it is strongly desired to reduce the size and to increase a capacity of solid electrolytic capacitors used around the CPU of a personal computer. Furthermore, there is also a demand for lower equivalent series resistance (ESR) in response to high frequencies, and lower equivalent series inductance (ESL) with excellent noise removal and transient response. Various studies are made to meet such demands.

Figure 6:
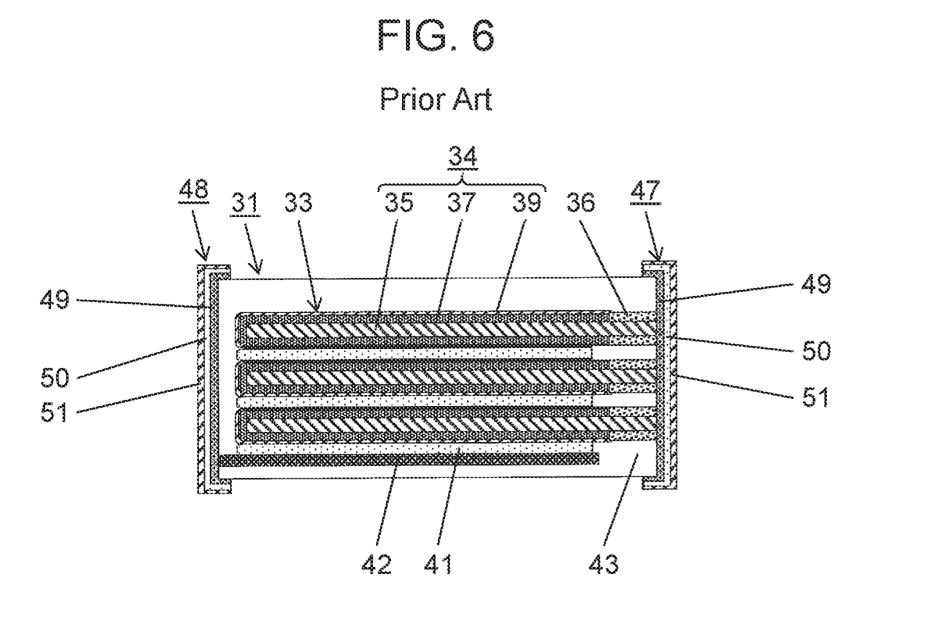
FIG. 6 is a diagram for describing a configuration of a multilayer solid electrolytic capacitor in the related art described in International Publication No. 2014/188833.

A configuration of a multilayer solid electrolytic capacitor in the related art described in International Publication No. 2014/188833 will be described with reference to FIG. 6. Solid capacitor element 31 is configured by laminating a plurality of capacitor elements. The capacitor element includes valve acting metal substrate 34 having core 35 and rough surface portion 36 formed along the surface thereof, dielectric oxide film layer 37 formed on rough surface portion 36, and composite layer 39 of a solid electrolyte layer and a current collector layer formed on dielectric oxide film layer 37. Each current collector layer of the plurality of capacitor elements is electrically connected to each other.

Electrically insulating exterior 43 covers laminated body 33 with one end face of valve acting metal substrate 34 exposed. Anode-side external electrode 47 electrically connected to core 35 of valve acting metal substrate 34 is provided on one end face of exterior 43. In addition, cathode-side external electrode 48 electrically connected to the current collector layer is provided on the other end face of exterior 43.

Anode-side external electrode 47 includes first conductive layer 49, second conductive layer 50, and third conductive layer 51. First conductive layer 49 is formed so as to be in direct contact with core 35 of valve acting metal substrate 34, and second conductive layer 50 is formed on the outside of first conductive layer 49.

SUMMARY

According to an aspect of the present disclosure, there is provided a solid electrolytic capacitor including: a capacitor element that has an anode body, a dielectric oxide film layer covering the anode body, and a cathode body formed on the dielectric oxide film layer; an exterior body that covers the capacitor element; a contact layer that is on an anode terminal portion, which is an end portion of the anode body, and has a surface with a predetermined surface roughness; and an anode-side electrode layer that covers the surface.

According to another aspect of the present disclosure, there is provided a method of manufacturing a solid electrolytic capacitor, including: a step of forming a capacitor element having an anode body; a step of covering the capacitor element with an exterior body; a step of exposing an anode terminal portion, which is an end portion of the anode body, from the exterior body; a step of forming a contact layer on the anode terminal portion; a step of forming a predetermined roughness on a surface of the contact layer; and a step of coating the surface of the contact layer with an anode-side electrode layer.

DETAILED DESCRIPTIONS

In the solid electrolytic capacitor disclosed in International Publication No. 2014/188833, after first conductive layer 49 is formed on one end face of valve acting metal substrate 34 by sputtering or the like, second conductive layer 50 and third conductive layer 51 are sequentially formed so as to cover first conductive layer 49. In such a case, it is considered that the conductive layers are bonded by the anchor effect.

Since the bonding strength between the conductive layers due to the anchor effect is relatively low, defects such as peeling off are likely to occur. When defects such as peeling off occur, since the electrical characteristics and mechanical characteristics (mechanical strength) of the solid electrolytic capacitor deteriorate, countermeasures are required.

It is an object of the present disclosure to provide a solid electrolytic capacitor having improved electrical characteristics and mechanical characteristics, and a method of manufacturing the same.

Hereinafter, exemplary embodiments of the present disclosure will be described with reference to the drawings.

Structure

Figure 1A:
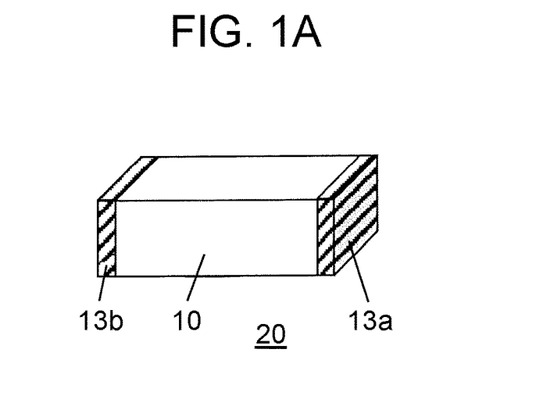
FIG. 1A is a perspective view of a solid electrolytic capacitor according to an exemplary embodiment of the present disclosure.
Figure 1B:
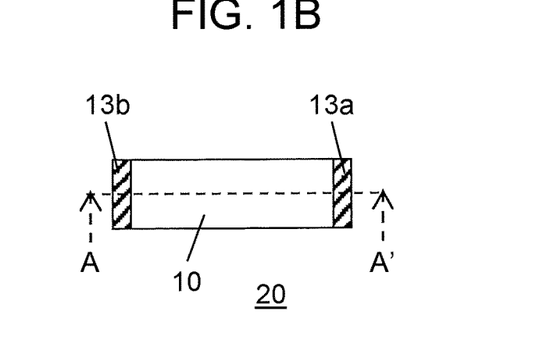
FIG. 1B is a top view of the solid electrolytic capacitor.
Figure 1C:
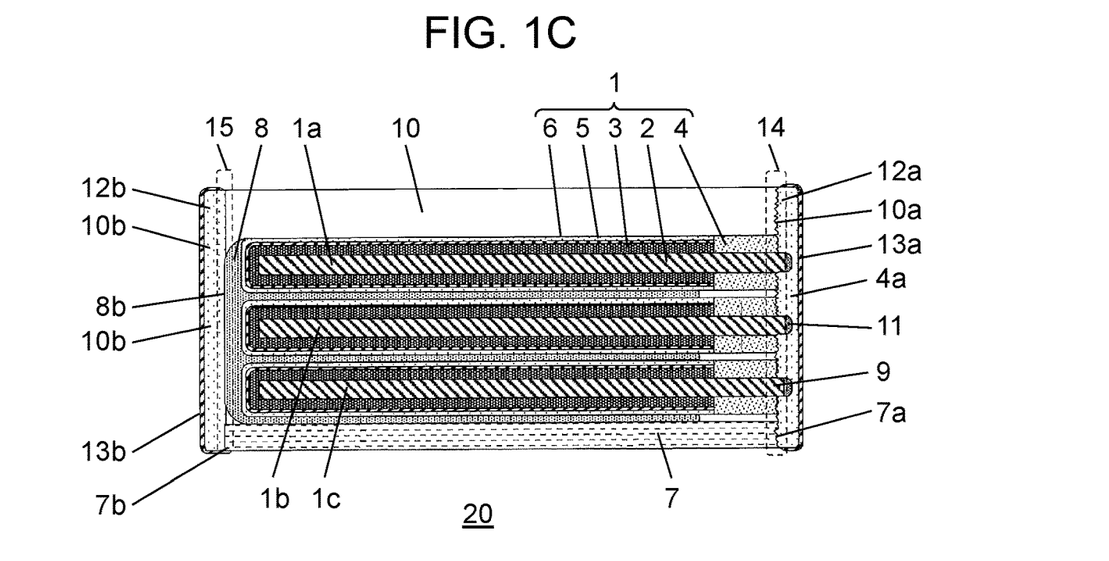
FIG. 1C is a cross-sectional arrow view taken along line A-A' of FIG. 1B.

FIG. 1A is a perspective view illustrating a solid electrolytic capacitor according to an exemplary embodiment of the present disclosure. FIG. 1B is a top view of the solid electrolytic capacitor. FIG. 1C is a cross-sectional arrow view taken along line A-A' of FIG. 1B. The upward direction in the following description corresponds to the upward direction in FIG. 1C, and the downward direction in the following description corresponds to the downward direction in FIG. 1C.

Solid electrolytic capacitor 20 illustrated in FIGS. 1A to 1C includes capacitor element 1, support member 7, conductive material 8, anode terminal portion 9, exterior body 10, contact layer 11, anode-side electrode layer 12a, cathode-side electrode layer 12b, anode-side external electrode 13a, and cathode-side external electrode 13b.

Capacitor Element 1

As illustrated in FIG. 1C, capacitor element 1 includes anode body 2, dielectric oxide film layer 3, insulation layer 4, solid electrolyte layer 5, and cathode body 6.

Dielectric oxide film layer 3 is obtained by forming a porous layer on both sides of an aluminum (Al) foil, which is a valve metal, by a method such as chemical etching, and forming a dielectric film on the porous layer. Anode body 2 is a core material portion of the Al foil that remains without being made porous. Dielectric oxide film layer 3 is disposed on an upper surface and a lower surface of anode body 2.

The thickness of anode body 2 and the thickness of dielectric oxide film layer 3 are 20 μm or more and 80 μm or less, respectively. The material of anode body 2 and dielectric oxide film layer 3 is not limited to Al foil, and may be, for example, tantalum (Ta) generally used as a capacitor material.

Anode terminal portion 9 is an end portion of anode body 2 on the anode side. Insulation layer 4 is formed on the upper surface and the lower surface of anode body 2 in the vicinity of anode terminal portion 9. Anode terminal portion 9, dielectric oxide film layer 3, and cathode body 6 (described later) are electrically separated by insulation layer 4.

As a method of forming insulation layer 4, a known appropriate method may be adopted. For example, a method can be adopted in which a portion of dielectric oxide film layer 3 is completely removed by laser or chemical etching, and then anode body 2 is coated with an insulating resin such as polyimide, polyamide, or epoxy. Alternatively, for example, a method of applying compressive stress to dielectric oxide film layer 3 to form a dense layer to have insulating properties, a method of impregnating a portion of porous dielectric oxide film layer 3 with an insulating resin, and the like may be adopted.

In addition, although FIG. 1 illustrates the case where insulation layer 4 has a single structure, insulation layer 4 may have a composite structure in which different materials are combined. For example, insulation layer 4 may have a laminated structure of a dense Al oxide film and a polyimide resin.

Dielectric oxide film layer 3 insulated from solid electrolyte layer 5 by insulation layer 4 has a configuration in which a solid electrolyte layer is formed on a porous layer formed on both sides of the Al foil by a method such as chemical etching. The solid electrolyte layer is formed by a method such as chemical polymerization or electrolytic polymerization using a conductive polymer material such as polypyrrole or polythiophene.

Cathode body 6 is formed on dielectric oxide film layer 3. Cathode body 6 is formed by sequentially laminating a carbon layer and a conductive silver (Ag) paste layer by, for example, a printing method or a transfer method.

Cathode body 6 is not limited to the laminated structure of the carbon layer and the conductive Ag paste layer. For example, cathode body 6 may contain a conductive paste using a filler other than Ag, a sintering material, or the like, instead of the conductive Ag paste. Examples of fillers other than Ag include copper (Cu) or nickel (Ni) core materials coated with Ag.

Capacitor Element 1

As illustrated in FIG. 1C, solid electrolytic capacitor 20 has a plurality of capacitor elements 1 laminated on each other in the vertical direction. In the example illustrated in FIG. 1C, three capacitor elements 1a, 1b, and 1c are laminated, and in the present disclosure, the number of capacitor elements 1 laminated on each other is not limited to three.

Capacitor element 1c disposed at the lowermost side is fixed on support member 7 via conductive material 8. Capacitor elements 1b and 1a are laminated on fixed capacitor element 1c via conductive material 8. In the following description, any one of laminated capacitor elements 1a, 1b, and 1c may be referred, or a plurality of capacitor elements may be collectively referred to as capacitor element 1.

As support member 7, for example, a glass epoxy board, a board having excellent heat resistance such as a bismaleimide-triazine (BT) resin or a polyimide resin board, a lead frame made of Cu, or the like can be adopted. However, in a case where a conductive material such as a lead frame is used, it is necessary to insulate an anode side and a cathode side.

As conductive material 8, for example, a conductive paste such as a conductive Ag paste is adopted. Conductive material 8 is electrically connected to cathode body 6 of capacitor element 1. Conductive material 8 may be an attachable sheet shape instead of the paste shape.

In addition, in the example illustrated in FIG. 1C, only conductive material 8 is provided between the capacitor elements adjacent to each other. For example, in addition to conductive material 8, a metal foil such as Al, Cu, indium (In) may be interposed.

The plurality of capacitor elements 1 are covered with exterior body 10 so that cathode terminal portion 8b, which is an end portion on the cathode side, and anode terminal portion 9, which is an end portion on the anode side, are exposed.

Contact Layer 11

Anode terminal portion 9 is formed at the end portion of anode body 2 on the anode side, and as described above, anode terminal portion 9 is not covered with exterior body 10.

Anode terminal portion 9 is formed with contact layer 11 using a metal material having a lower ionization tendency than that of anode body 2. Contact layer 11 is not formed on exterior body 10 and insulation layer 4 which are resin-based materials, and is selectively formed only on the surface of anode terminal portion 9 which is a metal material. Anode-side electrode layer 12a and anode-side external electrode 13a are formed on the further outer side of contact layer 11. Contact layer 11, anode-side electrode layer 12a, and anode-side external electrode 13a are electrically connected to each other. As a result, electrical conduction between anode terminal portions 9 of laminated capacitor elements 1 is mainly performed via anode-side electrode layer 12a.

In a case where anode body 2 is formed of Al as described above, examples of the material of contact layer 11 include zinc (Zn), Ni, Sn, Cu, Ag, and the like. Since the formation of an oxide film on the surface of contact layer 11 is suppressed by using a metal material having a lower ionization tendency than that of anode body 2, the electrical connection between contact layer 11 and anode-side electrode layer 12a can be further ensured.

It is more preferable to use Cu, Zn, or Ag having a short interatomic distance as the material of contact layer 11. In a case where Cu, Zn, or Ag is used as the material of contact layer 11, since an alloy layer formed by a metal bond is formed between contact layer 11 and anode body 2, the bonding strength between contact layer 11 and anode body 2 can be further strengthened. Contact layer 11 may be made of an alloy such as bronze or brass, or may be made by laminating different metals such as Cu and Ag, in addition to being made of a single element metal.

Figure 2:
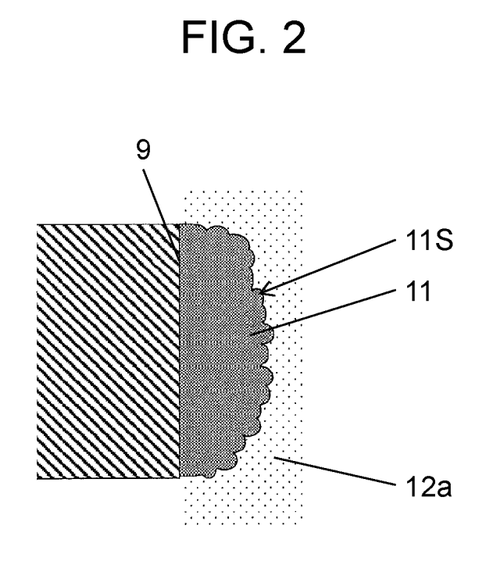
FIG. 2 is an enlarged cross-sectional view illustrating a preferable cross-sectional shape of a contact layer in the present disclosure.

FIG. 2 is an enlarged cross-sectional view illustrating a preferable cross-sectional shape of contact layer 11 in the present disclosure. Surface 11S on anode-side electrode layer 12 side of contact layer 11 has a predetermined roughness. The surface roughness (arithmetic mean roughness Ra) of surface 11S of contact layer 11 is preferably 3 μm or more, for example. Due to such surface roughness, the surface area of surface 11S increases, so that the contact area between contact layer 11 and anode-side electrode layer 12a also increases. As a result, although details will be described later, the electrical resistance between contact layer 11 and anode-side electrode layer 12a can be reduced, and the bonding strength (mechanical strength) can be increased.

The manufacturing step of contact layer 11 will be described in detail later, and it is preferable that contact layer 11 is formed by a cold spray method. The cold spray method is a technique of accelerating metal particles on the order of several μm to several tens of μm at subsonic, sonic or supersonic speeds by a compressed gas such as air, nitrogen, helium, causing the metal particles to collide with a base material in a solid phase to bond the metal particles to the base material, and forming a metal film.

In a case where contact layer 11 is formed by the cold spray method, the grain shape of the metal particles collided for the formation of contact layer 11 remains on surface 11S. Therefore, as illustrated in FIG. 2, surface 11S of contact layer 11 has the above-described surface roughness due to irregularities caused by the grain shape of the metal particles. The reason will be described later, and for example, by using metal particles having a median diameter of 5 μm to 10 μm, the surface roughness of surface 11S can be set to 3 μm or more.

Figure 3:
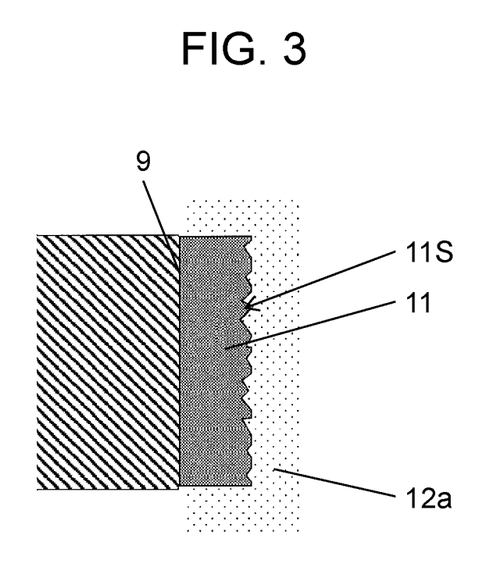
FIG. 3 is an enlarged cross-sectional view when the contact layer is formed by a method other than a cold spray method.

In the present disclosure, contact layer 11 is not necessarily required to be formed by a cold spray method, and may be formed by, for example, a plating method, a solder dip method, a sputtering or vapor deposition method, or the like. In this case, a step of forming contact layer 11 by a plating method, a solder dip method, a sputtering or vapor deposition method, or the like and then physically roughening surface 11S by a blast method or the like is required. FIG. 3 is an enlarged cross-sectional view when contact layer 11 is formed by a method other than a cold spray method.

Anode-Side Electrode Layer 12a and Cathode-Side Electrode Layer 12b

As described above, the laminated body of capacitor element 1 is covered with exterior body 10, and cathode terminal portion 8b, which is the end portion on the cathode side, and anode terminal portion 9, which is the end portion on the anode side, are exposed from exterior body 10. In the following description, the end face of the laminated body of capacitor element 1 including anode terminal portion 9, anode-side end face 4a of insulation layer 4, anode-side end face 10a of exterior body 10, and anode-side end face 7a of support member 7 is referred to as anode-side end face 14. In addition, the end face of the laminated body of capacitor element 1 including cathode terminal portion 8b, which is the cathode-side end face of conductive material 8, cathode-side end face 10b of exterior body 10, and cathode-side end face 7b of support member 7 is referred to as cathode-side end face 15.

Anode-side end face 14 and cathode-side end face 15 are covered with anode-side electrode layer 12a and cathode-side electrode layer 12b, respectively. In addition, anode-side electrode layer 12a and cathode-side electrode layer 12b are covered with anode-side external electrode 13a and cathode-side external electrode 13b, respectively.

The material of anode-side electrode layer 12a and cathode-side electrode layer 12b is preferably a conductive paste material (conductive resin material) in which a metal filler (metal particles) such as Ag or Cu is mixed in a resin material serving as a binder. As a result, since a binder component suitable for adhesion to the materials constituting insulation layer 4, exterior body 10, and support member 7 can be added to the resin material, bonds between insulation layer 4, exterior body 10, and support member 7, and anode-side electrode layer 12a and cathode-side electrode layer 12b can be expected by chemical bonds or hydrogen bonds.

Furthermore, it is desirable that the surface roughness (Ra) of each of anode-side end face 4a and cathode-side end face 4b of insulation layer 4, anode-side end face 10a and cathode-side end face 10b of exterior body 10, and anode-side end face 7a and cathode-side end face 7b of support member 7 is 5 μm or more. With such a configuration, the contact area between each end face, anode-side electrode layer 12a, and cathode-side electrode layer 12b can be increased, and a strong bond due to the anchor effect can be imparted.

Manufacturing Method

Next, a method of manufacturing the solid electrolytic capacitor according to the exemplary embodiment of the present disclosure will be described with reference to FIGS. 4A to 4C and FIGS. 5A to 5C. Each of FIGS. 4A to 4C and FIGS. 5A to 5C is a cross-sectional view of the solid electrolytic capacitor in each step of the method of manufacturing the solid electrolytic capacitor.

Laminating Step

Figure 4A:
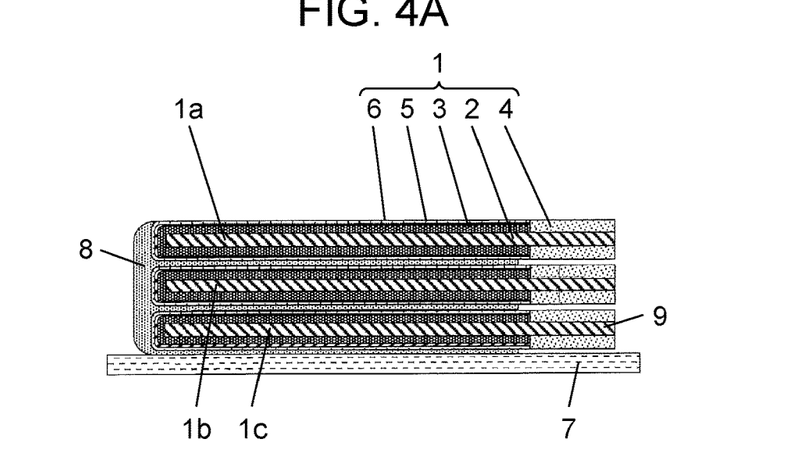
FIG. 4A is a cross-sectional view of the solid electrolytic capacitor in a laminating step of a method of manufacturing the solid electrolytic capacitor.

First, a laminating step illustrated in FIG. 4A is performed. In the laminating step, an appropriate amount of conductive material 8 is applied onto support member 7, and one of a plurality of capacitor elements 1 prepared in advance (capacitor element 1c) is placed on support member 7 with high accuracy.

Next, an appropriate amount of conductive material 8 is applied on capacitor element 1c, and capacitor element 1b is placed on conductive material 8. Furthermore, an appropriate amount of conductive material 8 is applied on capacitor element 1b, and capacitor element 1a is placed on conductive material 8.

As a method of applying conductive material 8, for example, a known method such as a dispensing method, printing, an ink jet method, a clip method, or a transfer method can be appropriately adopted.

Conductive material 8 is thermoset using a high-temperature furnace or the like to conduct cathode bodies 6 of each of capacitor elements 1 to each other. Means for thermosetting are not limited to a high-temperature furnace, and for example, a hot plate or a reflow furnace may be used.

In the above description, the case where capacitor elements 1 are sequentially laminated at a portion on support member 7 is described, and a plurality of capacitor elements may be simultaneously laminated at a plurality of portions on support member 7 (for example, in a matrix of a plurality of columns and a plurality of rows).

Sealing Step

Figure 4B:
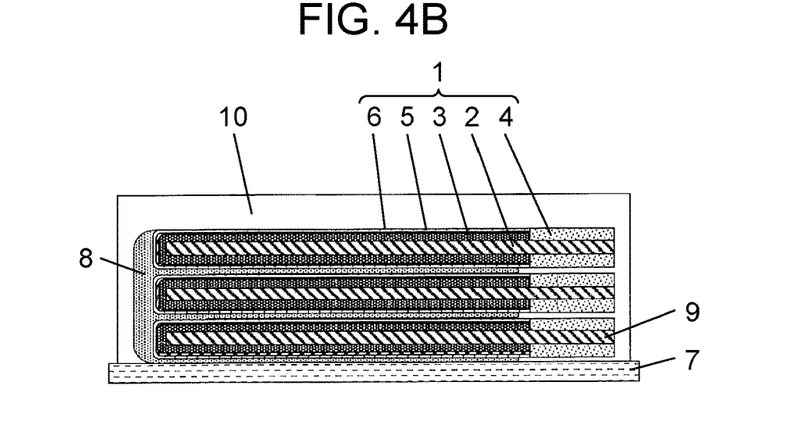
FIG. 4B is a cross-sectional view of the solid electrolytic capacitor in a sealing step of a method of manufacturing the solid electrolytic capacitor.

Next, a sealing step illustrated in FIG. 4B is performed. In the sealing step, as illustrated in FIG. 4B, capacitor element 1 is sealed with exterior body 10 so as to cover entire laminated capacitor element 1. At this time, it is preferable that exterior body 10 is also filled in a gap between laminated capacitor elements 1 and a gap between support member 7 and capacitor element 1. The gap between laminated capacitor elements 1 and the gap between support member 7 and capacitor element 1 may be previously filled with a resin material different from that of exterior body 10.

As a method of sealing capacitor element 1 using exterior body 10, for example, a known method such as a transfer method, a compression method, or a method in which a liquid resin is poured into a mold and then heat-cured may be appropriately adopted.

Picking-Up End Face Step

Figure 4C:
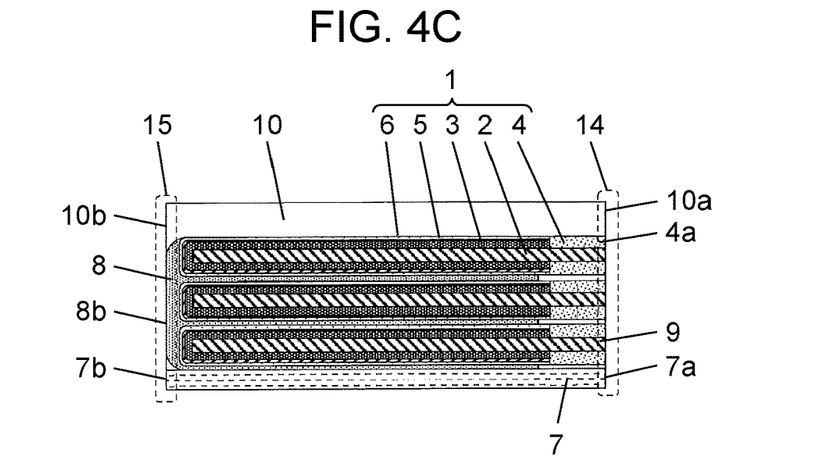
FIG. 4C is a cross-sectional view of the solid electrolytic capacitor in a picking-up end face step in a method of manufacturing the solid electrolytic capacitor.

Next, a picking-up end face step illustrated in FIG. 4C is performed. In the picking-up end face step, on the anode side of capacitor element 1 sealed with exterior body 10, the end face is picked up so that anode terminal portion 9 is exposed from exterior body 10. As a result, anode-side end face 14 is formed. In addition, the end face is picked up so that cathode terminal portion 8b is exposed on the cathode side. As a result, cathode-side end face 15 is formed.

As a method of picking-up the end face, for example, a method of cutting capacitor element 1 sealed with exterior body 10 by rotating a dicing blade in which diamond particles are fixed with a bond material at a high speed may be adopted.

Contact Layer Forming Step

Figure 5A:
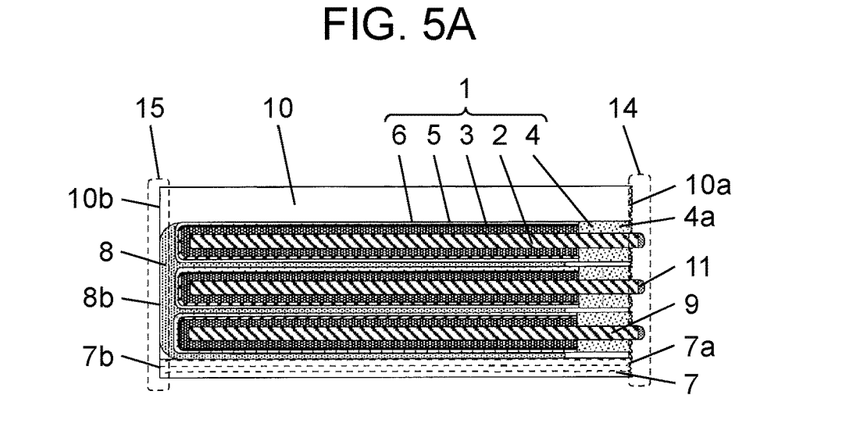
FIG. 5A is a cross-sectional view of the solid electrolytic capacitor in a contact layer forming step of a method of manufacturing the solid electrolytic capacitor.

Next, a contact layer forming step illustrated in FIG. 5A is performed. In the contact layer forming step, first, each end face (anode-side end face 4a, anode-side end face 10a, and anode-side end face 7a) constituting anode-side end face 14 is roughened. As a result, the adhesion between anode-side end face 4a, anode-side end face 10a, and anode-side end face 7a, and anode-side electrode layer 12a, which will be described later, is strengthened by the anchor effect. Contact layer 11 is selectively formed only on the surface of anode terminal portion 9.

As described above, the cold spray method is preferably used as a method of forming contact layer 11. When Cu particles, which are the material of contact layer 11, are sprayed onto anode-side end face 14 by the cold spray method, the Cu particles do not bond with anode-side end face 4a, anode-side end face 10a, and anode-side end face 7a formed of the resin material, and only bond with anode terminal portion 9 formed of the metal material.

More specifically, the Cu particles collided with anode terminal portion 9 at high speed break through the oxide film on the surface of anode terminal portion 9. As a result, Al and Cu particles, which are the materials of anode terminal portion 9, are plastically deformed by the energy of the collision at the collision location, and a new surface is formed. When the new surfaces of Al and Cu particles come into contact with each other, an alloy layer is formed by a metal bond between Al and Cu.

In anode-side end face 14, the thickness of anode terminal portion 9 formed of Al is thinner than that of anode-side end face 4a, anode-side end face 10a, and anode-side end face 7a formed of resin. Therefore, among the end faces of anode terminal portion 9, Cu particles are unlikely to adhere to the vicinity of the upper and lower ends corresponding to the boundary with the resin. Therefore, as illustrated in FIG. 2, the cross-sectional shape of surface 11S in the thickness direction of anode body 2 has a projection shape at the central portion. In addition, since Cu particles are plastically deformed and adhered to surface 11S while leaving the particle shape of the solid phase, the irregularities due to the particle shape are formed. As a result, surface 11S is imparted a surface roughness determined by the size of the Cu particles. As described above, since the surface roughness (Ra) of surface 11S is preferably 3 μm or more, the size of the Cu particles used as the material of contact layer 11 is preferably approximately 5 μm to 10 μm in median diameter. In addition, the Cu particles are preferably spherical or substantially spherical.

By increasing the median diameter of the Cu particles used to approximately 5 μm to 10 μm, in the formation of contact layer 11 by the cold spray method, sufficient acceleration can be performed, and it is likely to form a good metal bonding state with anode terminal portion 9.

In addition, by making the Cu particles spherical or close to spherical, sufficient acceleration can be performed, and it is possible to be likely to form a good metal bonding state with anode terminal portion 9. In a case where the Cu particles are spherical shapes or shapes other than spherical shapes, for example, rod-shaped or polyhedral-shaped, acute angles are generated on surface 11S formed by the volume of the particles. As a result, on the bonding surface between contact layer 11 and anode-side electrode layer 12a formed in the electrode layer forming step described later, cracks are likely to occur in anode-side electrode layer 12a starting from an acute angle. That is, by making the Cu particles spherical or spherical particles, surface 11S is formed mainly on a curved surface, so that cracks can be unlikely to occur.

By setting the surface roughness of surface 11S of contact layer 11 to 3 μm or more, the following effects can be obtained. On surface 11S side of contact layer 11, anode-side electrode layer 12a is formed in the electrode layer forming step described later. Here, since the conductive filler such as Ag contained in anode-side electrode layer 12a has a size of approximately less than 1 μm, by setting the surface roughness of surface 11S to 3 μm or more, the conductive filler can easily enter the inside of the irregularities of surface 11S. As a result, the contact area between surface 11S and anode-side electrode layer 12a can be increased and the contact resistance can be reduced as compared with the case where surface 11S is formed smoothly. In addition, due to the anchor effect generated by a portion of anode-side electrode layer 12a entering the irregularities of surface 11S, the bonding strength (mechanical strength) between contact layer 11 and anode-side electrode layer 12a can be increased.

In the present disclosure, it is preferable that the cold spray method is used for forming contact layer 11, and as described above, contact layer 11 may be formed by a method of forming another metal film such as a plating method, a solder dip method, a sputtering method, or a vapor deposition method. In a case where the plating method is used, the Al surface of anode terminal portion 9 may be plated with Ni having a low ionization tendency. In addition, contact layer 11 may be formed by combining a plurality of layers such as Ni+Ag plating. In such a case, the cross-sectional shape of surface 11S in the thickness direction of anode body 2 is a substantially linear shape as illustrated in FIG. 3.

In a case where a method of forming a metal film other than the cold spray method such as a plating method, a solder dip method, a sputtering method, or a vapor deposition method is used, as described above, a step of physically roughening the surface after forming the metal film is required. As a roughening method, a blast method or the like in which non-metal particles such as alumina, sand, and glass are sprayed may be used. Even in such a method, contact layer 11 having the surface roughness as illustrated in FIG. 3 can be formed. In the blasting treatment, the surface roughness of surface 11S can be made 3 μm or more by using a non-metal powder having a fine size of 3 μm or more.

In addition, although not illustrated, it is possible to prevent the intrusion of the plating solution or the like by filling insulation layer 4 with an insulating resin or the like to improve the sealing property.

Electrode Layer Forming Step

Figure 5B:
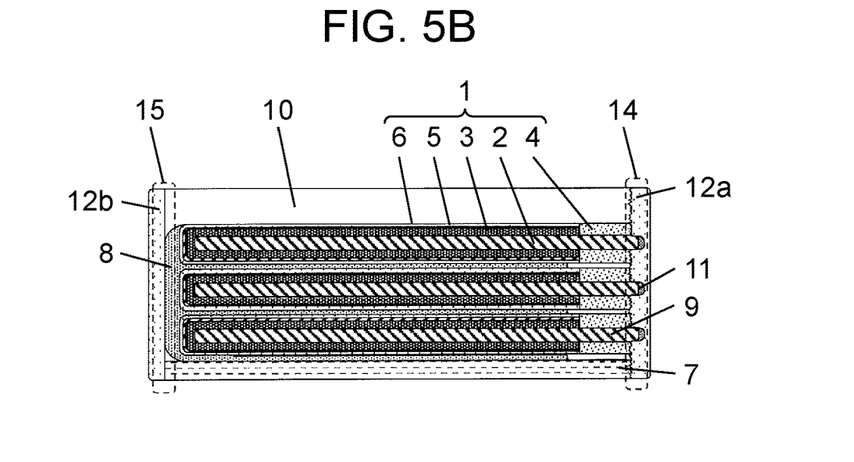
FIG. 5B is a cross-sectional view of the solid electrolytic capacitor in an electrode layer forming step of a method of manufacturing the solid electrolytic capacitor.

Next, as illustrated in FIG. 5B, an electrode layer forming step is performed. In the electrode layer forming step, anode-side electrode layer 12a and cathode-side electrode layer 12b are formed on each of anode-side end face 14 and cathode-side end face 15. As a result, anode body 2 is electrically connected to anode-side electrode layer 12a, and cathode body 6 is electrically connected to cathode-side electrode layer 12b.

Specifically, anode-side electrode layer 12a and cathode-side electrode layer 12b are formed by applying Ag paste to anode-side end face 14 and cathode-side end face 15 by using a clip method, a transfer method, a printing method, a dispensing method, or the like, and then curing at a high temperature.

Anode-side electrode layer 12a may cover not only anode-side end face 14 but also at least a portion of the upper surface of exterior body 10 or the lower surface of support member 7. Similarly, cathode-side electrode layer 12b may cover not only cathode-side end face 15 but also a portion of the upper surface of exterior body 10 or the lower surface of support member 7.

External Electrode Forming Step

Figure 5C:
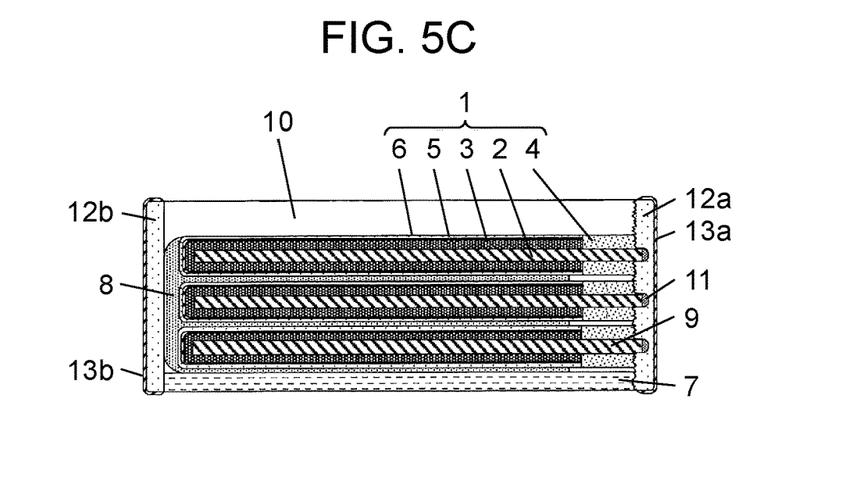
FIG. 5C is a cross-sectional view of the solid electrolytic capacitor in an external electrode forming step of a method of manufacturing the solid electrolytic capacitor.

Finally, as illustrated in FIG. 5C, an external electrode forming step is performed. As illustrated in FIG. 5C, anode-side external electrode 13a is formed on the outer surface of anode-side electrode layer 12a, and cathode-side external electrode 13b is formed on the outer surface of cathode-side electrode layer 12b.

Specifically, anode-side external electrode 13a and cathode-side external electrode 13b are formed by using a barrel plating method or the like, which is one of the electrolytic plating methods. Anode-side external electrode 13a and cathode-side external electrode 13b have, for example, a laminated structure of Ni and Sn.

Anode-side external electrode 13a and cathode-side external electrode 13b may be formed as a structure containing Ag and Sn by using the cold spray method described above. Alternatively, anode-side external electrode 13a and cathode-side external electrode 13b may be formed by a combination of a barrel plating method and a solder dip method.

Furthermore, anode-side external electrode 13a and cathode-side external electrode 13b may be formed by a method in which a cap of Cu material previously coated with Sn film is adhered to anode-side electrode layer 12a and cathode-side electrode layer 12b formed of Ag paste that functions as an adhesive.

Effect

The present disclosure can provide the solid electrolytic capacitor having improved electrical characteristics and mechanical characteristics, and the method of manufacturing the same.

Solid electrolytic capacitor 20 according to the exemplary embodiments of the present disclosure is provided with capacitor element 1 having anode body 2, dielectric oxide film layer 3 covering anode body 2, and cathode body 6 formed on dielectric oxide film layer 3, exterior body 10 covering capacitor element 1, contact layer 11 formed on anode terminal portion 9, which is the end portion of anode body 2, and having surface 11S with a predetermined surface roughness, and anode-side electrode layer 12 covering surface 11S.

As described above, by providing contact layer 11 which is metal-bonded to anode terminal portion 9 made of the valve acting metal foil and has a predetermined surface roughness, the contact area between contact layer 11 and anode-side electrode layer 12a is increased. Therefore, the contact resistance between contact layer 11 and anode-side electrode layer 12a is lowered, and the bonding strength between contact layer 11 and anode-side electrode layer 12a is increased. Therefore, a low resistance current path can be secured from anode body 2 to anode-side external electrode 13a, the electrical characteristics of solid electrolytic capacitor 20 can be improved, and the mechanical strength can be improved, so that the reliability is improved.

The present disclosure is not limited to the description of the above exemplary embodiment, and various modifications can be made without departing from the spirit of the present disclosure.

The solid electrolytic capacitor of the present disclosure has high reliability and productivity while maintaining good electrical characteristics, and can be applied as a capacitor in all fields such as a personal computer, a mobile terminal, industrial use, and in-vehicle use.

What is claimed is:

1. A solid electrolytic capacitor comprising:
    a capacitor element that has
        an anode body,
        a dielectric oxide film layer covering the anode body, and
        a cathode body formed on the dielectric oxide film layer;
    an exterior body that covers the capacitor element;
    a contact layer bonded only to an anode terminal portion that is an end portion of the anode body, and has a surface with a predetermined surface roughness; and
    an anode-side electrode layer that covers the surface of the contact layer, wherein:
    at least part of the anode terminal portion protrudes from the exterior body and penetrates into the anode-side electrode layer, and
    a material of the anode-side electrode layer is a conductive resin material having first metal particles mixed in a resin material.

2. The solid electrolytic capacitor of claim 1, wherein the predetermined surface roughness is 3 µm or more.

3. The solid electrolytic capacitor of claim 1, wherein a cross-sectional shape of the surface of the contact layer in a thickness direction of the anode body has a projection shape or a substantially linear shape at a central portion.

4. The solid electrolytic capacitor of claim 1, wherein the contact layer is a metal film formed by accumulating second metal particles on the anode terminal portion.

5. The solid electrolytic capacitor of claim 4, wherein the second metal particles are spherical or substantially spherical.

6. The solid electrolytic capacitor of claim 4, wherein the contact layer and the anode terminal portion are metal-bonded to each other.

7. The solid electrolytic capacitor of claim 1, wherein the contact layer includes a metal having a lower ionization tendency than that of the anode body.

\* \* \* \* \*